United States Patent
Park

(10) Patent No.: US 12,135,312 B2
(45) Date of Patent: Nov. 5, 2024

(54) STRESS AND STRAIN AMOUNT DISTRIBUTION DISPLAY METHOD, DEVICE, AND PROGRAM

(71) Applicant: JAPAN SCIENCE AND TECHNOLOGY AGENCY, Kawaguchi (JP)

(72) Inventor: Myeong-heom Park, Kyoto (JP)

(73) Assignee: JAPAN SCIENCE AND TECHNOLOGY AGENCY, Kawaguchi (JP)

( * ) Notice: Subject to any disclaimer, the term of this patent is extended or adjusted under 35 U.S.C. 154(b) by 391 days.

(21) Appl. No.: 17/621,340

(22) PCT Filed: Jun. 15, 2020

(86) PCT No.: PCT/JP2020/023458
§ 371 (c)(1),
(2) Date: Dec. 21, 2021

(87) PCT Pub. No.: WO2020/262087
PCT Pub. Date: Dec. 30, 2020

(65) Prior Publication Data
US 2022/0412856 A1  Dec. 29, 2022

(30) Foreign Application Priority Data
Jun. 26, 2019 (JP) .................................. 2019-118848

(51) Int. Cl.
*G01N 3/20* (2006.01)
*G01B 11/16* (2006.01)
*G01N 3/06* (2006.01)

(52) U.S. Cl.
CPC ............ *G01N 3/20* (2013.01); *G01B 11/165* (2013.01); *G01N 3/068* (2013.01); *G01N 2203/0075* (2013.01); *G01N 2203/0647* (2013.01)

(58) Field of Classification Search
CPC .. G01N 3/20; G01N 3/068; G01N 2203/0075; G01N 2203/0647;
(Continued)

(56) References Cited

U.S. PATENT DOCUMENTS

| 4,591,996 A | 5/1986 | Vachon |
| 2014/0160279 A1 | 6/2014 | Grossnickle et al. |

(Continued)

FOREIGN PATENT DOCUMENTS

| CN | 103854280 A | 6/2014 |
| CN | 106370334 A | 2/2017 |

(Continued)

OTHER PUBLICATIONS

Mokhtarishirazabad, Mehdi & Lopez-Crespo, Pablo & Zanganeh, Mahsan. (2018). Stress intensity factor monitoring under cyclic loading by digital image correlation. Fatigue & Fracture of Engineering Materials & Structures. 41. 10.1111/ffe.12825. (Year: 2018).*

(Continued)

*Primary Examiner* — Andrae S Allison
(74) *Attorney, Agent, or Firm* — Muncy, Geissler, Olds & Lowe, P.C.

(57) ABSTRACT

A method of displaying stress distribution on a sample surface includes: step S4 of capturing images of the sample surface before loading, during the loading, and after unloading; step S5 of measuring a first strain amount for each pixel position based on correlation between the image before the loading and the image after the unloading; step S6 of measuring a second strain amount for each pixel position (Continued)

based on correlation between the image before the loading and the image during the loading; step S7 of calculating stress for each pixel position based on the difference between the first strain amount and the second strain amount; and step S8 of displaying the distribution of the calculated stress at each pixel position.

8 Claims, 10 Drawing Sheets

(58) Field of Classification Search
CPC ............ G01N 2203/0073; G01N 3/32; G01N 2203/0005; G01B 11/165; G01L 1/24; G01L 5/0047
See application file for complete search history.

(56) References Cited

U.S. PATENT DOCUMENTS

| | | | |
|---|---|---|---|
| 2020/0090901 A1* | 3/2020 | Favata | H01J 37/256 |
| 2020/0209126 A1* | 7/2020 | Thambi | G01N 3/36 |
| 2020/0225133 A1* | 7/2020 | Petel | G01T 1/20186 |
| 2020/0292302 A1* | 9/2020 | Georgeson | G01B 11/165 |

FOREIGN PATENT DOCUMENTS

| | | |
|---|---|---|
| EP | 2741071 A1 | 8/2019 |
| JP | 2014-115281 A | 6/2014 |
| JP | 2016-85153 A | 5/2016 |
| JP | 2016161291 A | 9/2016 |
| JP | 2016-206104 A | 12/2016 |
| WO | WO 2015/008404 A1 | 1/2015 |

OTHER PUBLICATIONS

Taniguchi, Akito, et al. "Macroscopic and microscopic non-uniform deformations of polycrystalline pure copper during uniaxial tensile test with high stress gradient." Key Engineering Materials 794 (Feb. 2019): 246-252. (Year: 2019).*

Wu, R., et al. "Real-time digital image correlation for dynamic strain measurement." Experimental Mechanics 56.5 (2016): 833-843. (Year: 2016).*

\* cited by examiner

STRESS AND STRAIN AMOUNT DISTRIBUTION DISPLAY METHOD, DEVICE, AND PROGRAM

TECHNICAL FIELD

The present invention relates to a stress and strain amount distribution display method, device, and program.

BACKGROUND ART

As a method for measuring strain amount distribution due to the deformation of a material surface, there is a digital image correlation method (hereinafter referred to as "DIC") (for example, Patent Literature 1).

[Patent Literature 1] WO 2015/008404

SUMMARY OF INVENTION

Technical Problem

Conventionally, it has been considered that even if an external force (load) is applied to a material such as metal so as to deform the material, if the load is sufficiently small, the metal material returns to its original state when the load is reduced to zero (when unloaded). In other words, the deformation in this case is reversible, and the material is considered to be entirely within an elastic region at this time. However, even within an elastic region where the load is small, repeated loading and unloading may cause local plastic deformation inside the material, and it is also considered that dislocation of the metal crystal lattice and local microcracks are generated due to such local plastic deformation and accumulated, which eventually leads to fatigue breakdown of the material. Therefore, it is important to measure the local plastic deformation to find the cause of the fatigue breakdown. However, it has been difficult to measure such local plastic deformation by using a method such as ordinary DIC.

In this background, a purpose of the present invention is to provide a method for displaying the distribution of local stress and strain amount generated by repeatedly loading and unloading a material.

Solution to Problem

A method according to one embodiment of the present invention includes: displaying strain amount distribution on a sample surface while repeatedly loading and unloading the sample; capturing images of the sample surface before loading and after unloading; measuring a strain amount for each pixel position based on correlation between the image before the loading and the image after the unloading; and displaying the distribution of the measured strain amount at each pixel position.

Another embodiment of the present invention also relates to a method. This method is a method of displaying stress distribution on a sample surface while repeatedly loading and unloading the sample and includes: capturing images of a sample surface before loading, during the loading, and after unloading; measuring a first strain amount for each pixel position based on correlation between the image before the loading and the image after the unloading; measuring a second strain amount for each pixel position based on correlation between the image before the loading and the image during the loading; calculating stress for each pixel position based on the difference between the first strain amount and the second strain amount; and displaying the distribution of the calculated stress at each pixel position.

Yet another embodiment of the present invention relates to a device. This device is a device that displays stress distribution on a sample surface while repeatedly loading and unloading the sample and includes: an image-capturing unit that captures images of a sample surface before loading, during the loading, and after unloading; a strain amount measurement unit that measures a first strain amount for each pixel position based on correlation between the image before the loading and the image after the unloading and measures a second strain amount for each pixel position based on correlation between the image before the loading and the image during the loading; a stress calculation unit that calculates stress for each pixel position based on the difference between the first strain amount and the second strain amount; and a display unit that displays the distribution of the calculated stress at each pixel position.

Still another embodiment of the present invention relates to a program. This program displays stress distribution on a sample surface while repeatedly loading and unloading the sample and includes computer-implemented modules including: a module that captures images of a sample surface before loading, during the loading, and after unloading; a module that measures a first strain amount for each pixel position based on correlation between the image before the loading and the image after the unloading; a module that measures a second strain amount for each pixel position based on correlation between the image before the loading and the image during the loading; a module that calculates stress for each pixel position based on the difference between the first strain amount and the second strain amount; and a module that displays the distribution of the calculated stress at each pixel position.

Optional combinations of the aforementioned constituting elements and implementations of the invention in the form of apparatuses, methods, systems, recording mediums, and computer programs may also be practiced as additional modes of the present invention.

Advantageous Effects of Invention

According to the present invention, the distribution of local stress and strain amount generated by repeatedly loading and unloading a material can be displayed.

DESCRIPTION OF EMBODIMENTS

Figure 1:
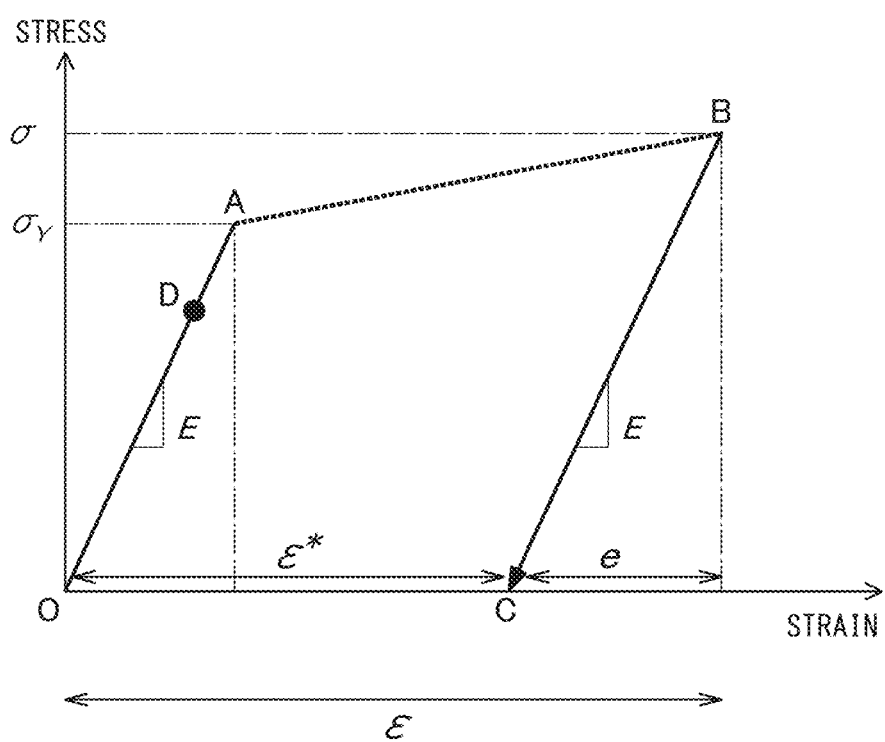
FIG. 1 is a graph showing the relationship between strain and stress when stress is applied to a material.

Hereinafter, the invention will be described based on preferred embodiments with reference to the accompanying drawings. In the embodiments and variations, identical or like constituting elements and members are represented by identical symbols and a duplicate description will be omitted. The dimension of members in the drawings are enlarged or reduced as appropriate to facilitate understanding. Those of the members that are not important in describing the embodiment are omitted from the drawings. Terms including ordinal numbers (first, second, etc.) are used to explain various constituting elements, but the terms are used merely for the purpose of distinguishing one constituting element from the other constituting elements and shall not limit the constituting elements.

It is considered that about 90% of damage to machine parts is caused by metal fatigue. A fatigue test is performed in order to investigate the fatigue breakdown of a material, in which stress and displacement are repeatedly applied to a test piece, and the presence or absence of fracture and the number of repetitions until the occurrence of fracture are measured. As a mechanism of metal fatigue breakdown, a material is repeatedly loaded and unloaded within an elastic region such that local plastic deformation occurs inside the material. It is considered that this local plastic deformation causes dislocation of the metal crystal lattices and local microcracks, which accumulate to cause fracture of the material.

The main cause of the local occurrence of plastic deformation as described above is considered to be local stress concentration due to the complexity of the material shape and the non-uniformity of the material itself. Therefore, in order to observe or predict the occurrence of local plastic deformation, it is desirable to be able to measure and display the local distribution of stress. However, although a conventional DIC can measure the distribution of a strain amount due to deformation, the conventional DIC cannot directly measure the distribution of stress generated in a material. In particular, since strain observed in the plastic region of a material includes both elastic strain and plastic strain, it is difficult to calculate stress directly from the strain. Therefore, the present inventor has devised a method for obtaining stress by extracting only elastic strain from the total strain observed in a plastic region. Before explaining a specific embodiment, an explanation will be first given with reference to FIGS. 1 and 2 regarding a method of obtaining stress by extracting only elastic strain when the total strain includes both elastic strain and plastic strain.

FIG. 1 shows a relationship between strain and stress when stress is applied to a material such as metal. The horizontal and vertical axes represent strain and stress, respectively.

When a stress of $\sigma_Y$ or less is applied to the material, the material elastically deforms. At this time, the strain is proportional to the stress. In other words, the state of the material changes from a point O to a point D along a straight line OA (load line). When the stress is set to zero (unloading) from this state, the state of the material returns to the point O, and the strain also becomes zero. The range from the point O to a point A is generally called an elastic region, and strain generated in the elastic region is called elastic strain. The maximum value $\sigma_Y$ of stress in the elastic region is called an elastic limit.

On the other hand, when a stress exceeding the elastic limit $\sigma_Y$ is applied to the material, the material enters the plastic region (the range from the point A to a point B). The point A at which the state of the material changes from the elastic region to the plastic region is called a yield point. As will be described later, since strain in the plastic region is the elastic strain plus the plastic strain, the slope of the stress with respect to the strain in the plastic region is gentler than that in the elastic region. Further, when the stress is unloaded in the plastic region, the state of the material returns to a point C along an unload line indicated by an arrow BC. The slope of this unload line is equal to the slope of the load line in the elastic region (that is, Young's modulus E). When the unloading is completed, elastic strain e goes through elastic recovery, and plastic strain $\varepsilon^*$ remains. The strain s generated in the plastic region is the sum of the elastic strain and the plastic strain.

Hereinafter, it is assumed that the material is an isotropic and homogeneous elastic body. Equations (1) shows a relationship between elastic strain and stress in one dimension, and equations (2) and (3) show a relationship between elastic strain and stress in two dimensions.

Expression 1
$$\sigma = Ee \quad (1)$$

Expression 2
$$\sigma_{11} = \frac{E}{1-\nu^2}(e_{11} + \nu e_{22}) \quad (2)$$

Expression 3
$$\sigma_{22} = \frac{E}{1-\nu^2}(e_{22} + \nu e_{11}) \quad (3)$$

where, E represents Young's modulus, $\nu$ represents Poisson's ratio, $\sigma$ represents stress in the length direction, e represents elastic strain in the length direction, $\sigma_{11}$ represents stress in a first direction, $e_{11}$ represents elastic strain in the first direction, $\sigma_{22}$ represents stress in a second direction, and $e_{22}$ represents elastic strain in the second direction.

As described above, the equations (1) to (3) all show a relationship between stress and elastic strain. Therefore, in order to obtain stress from strain in a plastic region based on these equations, it is necessary to remove plastic strain from the observed total strain and extract only elastic strain.

Figure 2:
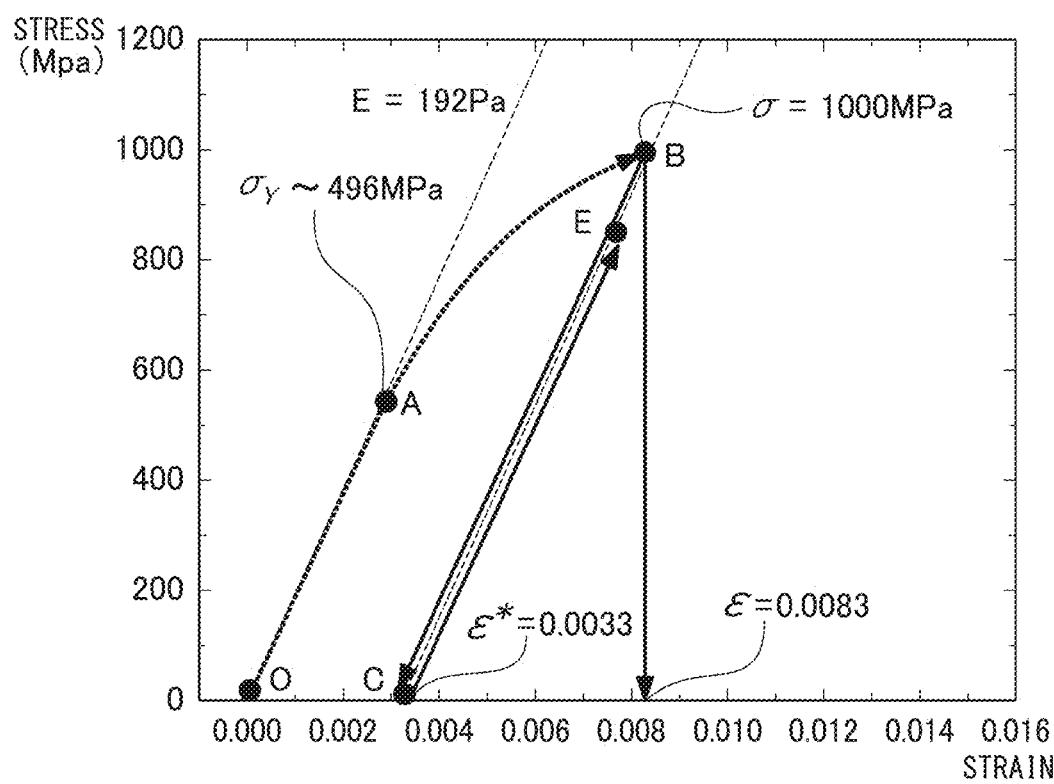
FIG. 2 is a graph showing the relationship between strain and stress when a stress measuring method according to the first embodiment is carried out to measure stress from total strain.

FIG. 2 is a graph showing a relationship between strain and stress when stress is measured from total strain. A dotted line represents a theoretical straight line based on the Young's modulus defined by the material mechanics, and a solid line represents measured values.

First, a stress larger than an elastic limit is applied to a material that is in a state of zero strain to bring the material into a state B of being in a plastic region (hereinafter referred to as the first state). As shown in the figure, when the stress applied to the material is increased, the state of the material changes from the point o to the first state B via a yield point A. In this example, the elastic limit is $\sigma_Y$=496 MPa (megapascal), and the stress in the first state B is $\sigma$=1000 MPa.

Next, a strain amount $\varepsilon$ in the first state B is measured at a plurality of measurement points set on the material. In this example, the strain amount, $\varepsilon$=0.0083, is obtained. As described above, the strain amount ε measured in this case is the sum of the elastic strain amount and the plastic strain amount.

Next, the stress applied to the material in the first state B is gradually reduced until the stress is unloaded to zero. Thereby, the state of the material changes along a straight line BC and changes from a point B to a point C (hereinafter referred to as a second state). As shown in the figure, an unload line indicated by a solid arrow BC closely matches a theoretical straight line indicated by a dotted line.

Next, a strain amount ε* in the second state C is measured at the above-mentioned plurality of measurement points. In this example, the strain amount, ε*=0.0033, is obtained. As described above, the strain amount ε* measured in this case is a plastic strain amount ε*.

Finally, an elastic strain amount e at the above-mentioned plurality of measurement points is calculated from the difference between the strain amount ε in the first state B and the plastic strain amount ε* in the second state C. In this example, the elastic strain amount e is obtained as follows:

$$e=ε-ε*=0.0083-0.0033=0.0050$$

In this way, at each measurement point, the plastic strain can be removed from the total strain observed in the plastic region, and only the elastic strain can be extracted. Thereby, for example, if a strain amount distribution can be obtained by DIC, the already-known Young's modulus and Poisson's ratio can be applied to equations (1) (in the case of one dimension) and equations (2) (3) (in the case of two dimensions), and the stress distribution can be thereby obtained.

In order to confirm the validity of the measurement obtained in the present embodiment, the present inventors conducted an experiment in which a material was put into the second state C and then stressed again so as to bring the state of the material to a point E. As a result, as shown in the figure, the load line from the point C to the point E was found to match the unload line from the point B to the point C with high accuracy, and the material in the state C was found to exhibit normal elastic characteristics.

As mentioned above, it is considered that even in a range that is conventionally regarded as an elastic region, local plastic deformation may occur due to repeated loading and unloading, and the local plastic deformation may be included inside the material. Therefore, in the present specification, strain regions at and below the yield point are collectively referred to as "elastic range". That is, an elastic range collectively refers to (1) a strain region occurring when the entire material is elastically deformed, and (2) a strain region occurring when an elastically deformed portion and a locally and plastically deformed portion are mixed inside the material. Some metal materials such as soft steel show a clear yield point. However, other metals may not have a clear yield point. Therefore, if a yield point is not clear, a point at which 0.2% permanent strain appears (0.2% proof stress) in a stress-strain curve is regarded as the yield point.

First Embodiment

Figure 3:
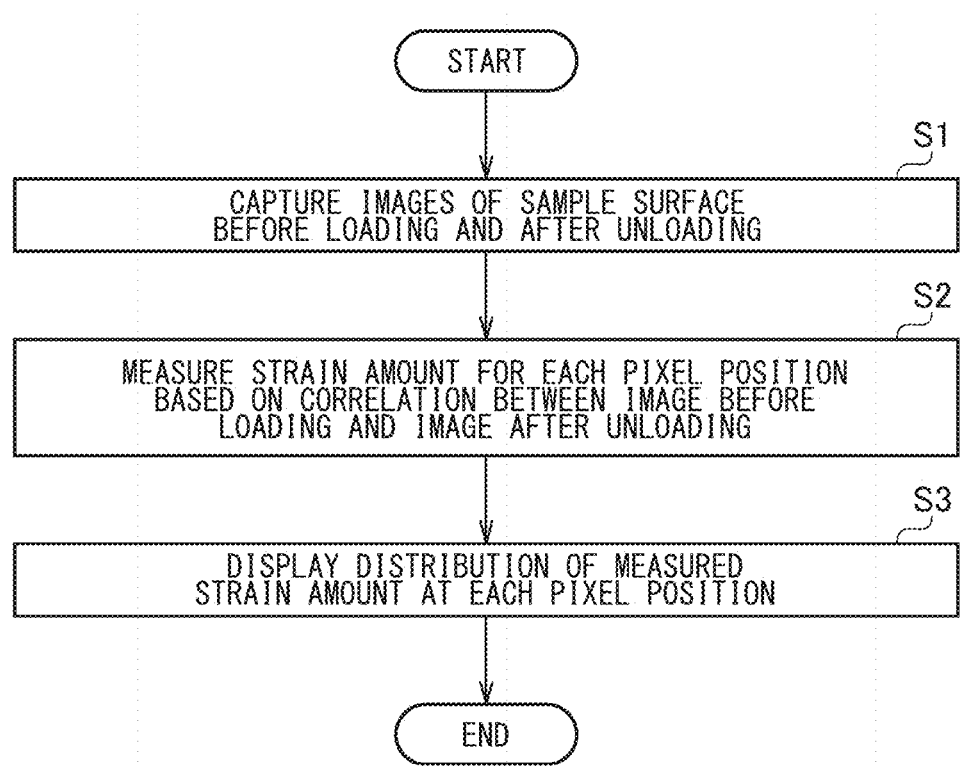
FIG. 3 is a flow chart of a method according to the first embodiment.

FIG. 3 is a flow chart of a method according to the first embodiment. This method is a method of displaying the strain amount distribution on a sample surface while repeatedly loading and unloading the sample and includes step S1, step S2, and step S3.

In step S1, images of the sample surface before the loading and after the unloading are captured in the present method. The device and means for the image capturing are not particularly limited. For example, a commonly-used digital camera, a microscope camera, a high-speed camera, or the like may be used. Further, one camera may be used for image capturing from one direction, or a plurality of cameras may be used for image capturing from different directions. Captured images are stored for each pixel position.

In step S2, a strain amount for each pixel position is measured based on the correlation between an image before the loading and an image after the unloading captured in step S1 in the present method. A specific means for measuring the strain amount is not particularly limited. For example, the displacement may be obtained by comparing the image before the loading and the image after the unloading and finding a place to which a point on the sample surface before the loading has moved after the unloading. The strain amount may be measured for all images before the loading and after the unloading, or several sets of images before the loading and after the unloading may be selected and measured. By executing step S2, strain generated on the sample surface in the process of repeating the loading and the unloading is obtained in chronological order for each pixel position.

In step S3, the distribution of the strain amount measured in step S2 is displayed at each pixel position in the present method. The display method is not particularly limited. The magnitude of strain may be displayed for each pixel position according to color, shading, contour lines, three-dimensional display, or the like. By executing step S3, the strain generated on the sample surface in the process of repeating the loading and the unloading is visualized in chronological order for each pixel position.

According to the present embodiment, since the distribution of the strain amount of a repeatedly loaded and unloaded sample can be displayed at each pixel position, local plastic deformation generated inside the material can be measured and visualized as strain amount distribution.

Second Embodiment

Figure 4:
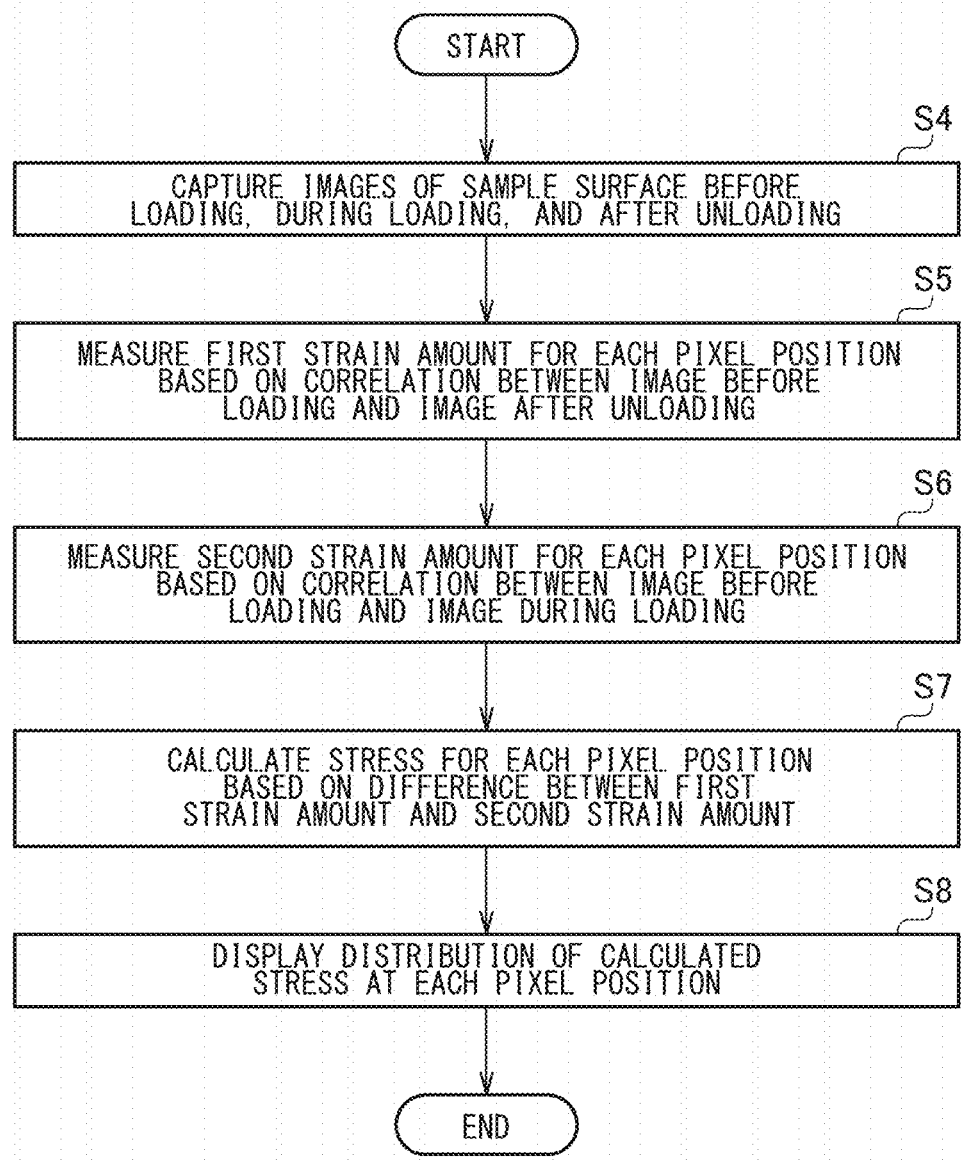
FIG. 4 is a flow chart of a method according to the second embodiment.

FIG. 4 is a flow chart of a method according to the second embodiment. This method is a method of displaying the stress distribution on a sample surface while repeatedly loading and unloading the sample and includes step S4, step S5, step S6, step S7, and step S8.

In step S4, images of the sample surface before the loading, during the loading, and after the unloading are captured in the present method. In other words, in step S4, in addition to step S1 of the first embodiment, an image of the sample surface under the loading (when a load is applied) is also captured.

In step S5, a first strain amount for each pixel position is measured based on the correlation between the image before the loading and the image after the unloading captured in step S4 in the present method. The first strain amount is a plastic strain (if any plastic strain is present).

In step S6, a second strain amount for each pixel position is measured based on the correlation between the image before the loading and the image during the loading captured in step S4 in the present method. The second strain amount is the sum (total strain) of the elastic strain and the plastic strain (if any plastic strain is present).

In step S7, the stress for each pixel position is calculated based on the difference between the first strain amount measured in step S5 and the second strain amount measured in step S6 in the present method. Execution of step S7 allows for the calculation of stress for each pixel position by calculating the difference between the second strain amount (total strain) and the first strain amount (plastic strain) for each pixel position according to the above method and thereby extracting only the elastic strain at each pixel position.

In step S8, the distribution of the stress calculated in step S7 is displayed at each pixel position in the present method. By executing step S8, the distribution of stress acting on the sample surface in the process of repeating the loading and the unloading is visualized in chronological order for each pixel position.

According to the present embodiment, since the distribution of the stress on a repeatedly loaded and unloaded sample can be displayed at each pixel position, local stress that causes local plastic deformation and the like generated inside the material can be measured and visualized as stress distribution.

In particular, the sample may be in the elastic range during the execution of the present method. According to this mode, the loading and unloading of the sample is repeated within a range generally regarded as an elastic region. At this time, if the entire material is within the elastic region and the deformation of the material is reversible, there should be no difference between the image before the loading and the image after the loading captured in step S4. On the other hand, if local plastic deformation occurs inside the material due to repeated loading and unloading, there should be a pixel position at which there is a difference between the image before the loading and the image after the loading captured in step S4. In other words, according to this embodiment, local plastic deformation generated by a small load (load applied within a range usually regarded as an elastic region) can be measured and visualized as stress distribution. This can provide insight into the local structure of a sample, which cannot be obtained by conventional fatigue tests of a type that repeats loading and unloading until fracture.

Third Embodiment

Figure 5:
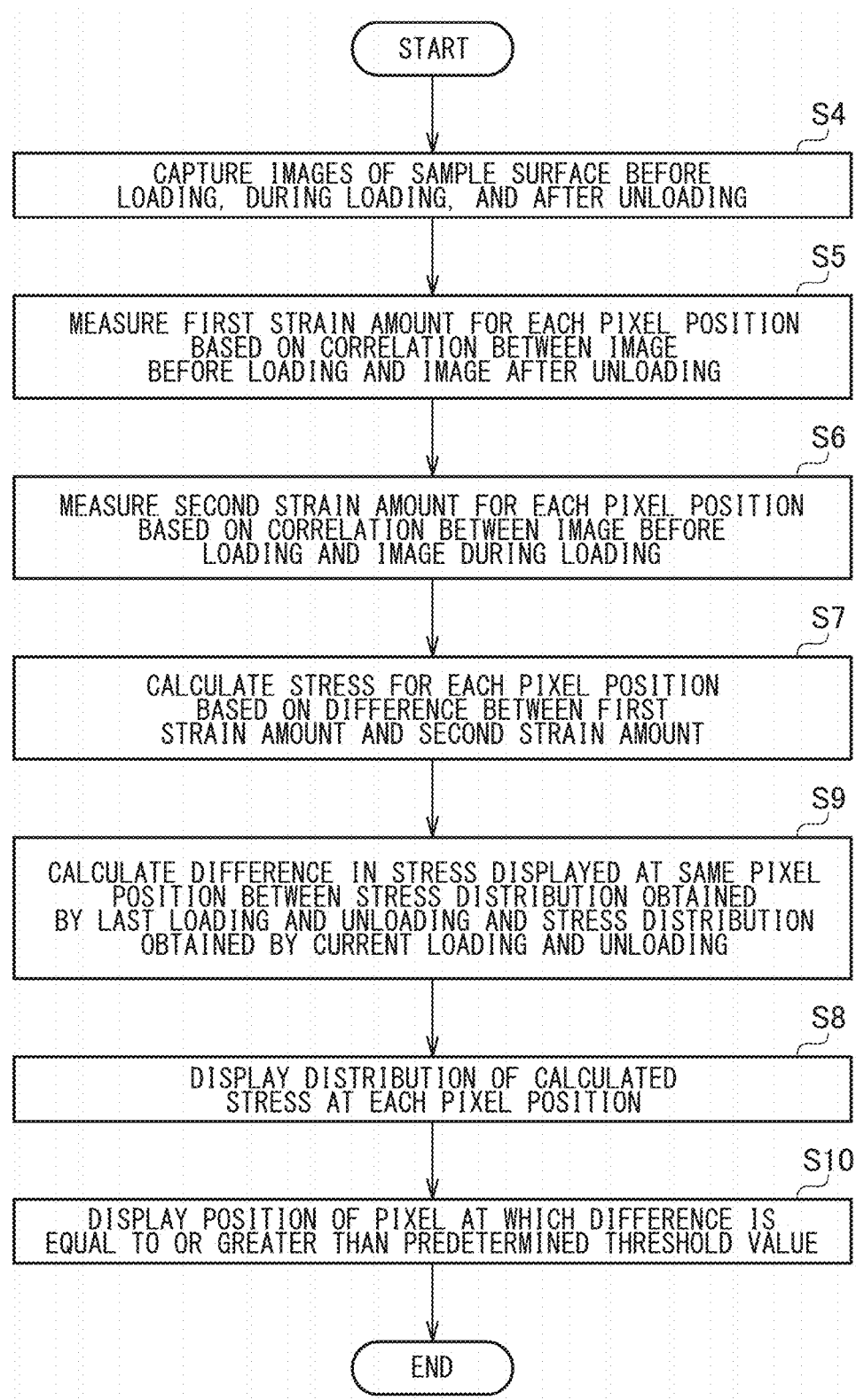
FIG. 5 is a flow chart of a method according to the third embodiment.

FIG. 5 is a flow chart of a method according to the third embodiment. The third embodiment further includes steps S9 and S10, as compared to the second embodiment.

In step S9, the difference in stress displayed at the same pixel position is calculated between stress distribution obtained by the last (referred to as (n−1)th time) loading and unloading and stress distribution obtained by the current (referred to as nth time) loading and unloading in the present method.

In step S10, the position of a pixel at which a difference calculated in step S9 is equal to or greater than a predetermined threshold value is displayed in the present method. In other words, the stress distribution after the (n−1)th unloading is compared with the stress distribution after the nth unloading, and if there is a pixel with a stress difference equal to or greater than the predetermined threshold value, the pixel position is displayed. At this time, since the stress at the pixel position has changed significantly, it can be considered that local plastic deformation or the like has very likely occurred in the sample at apart corresponding to the pixel position during the nth loading and unloading process. In other words, it can be estimated that the time at which the local plastic deformation or the like has occurred at the pixel position is during the nth loading and unloading process as a result of repeating loading and unloading the sample.

As described above, according to the present embodiment, it is possible to estimate and display the time and position when and where local plastic deformation or the like occurs inside a sample when the sample is repeatedly loaded and unloaded.

Fourth Embodiment

Figure 6:
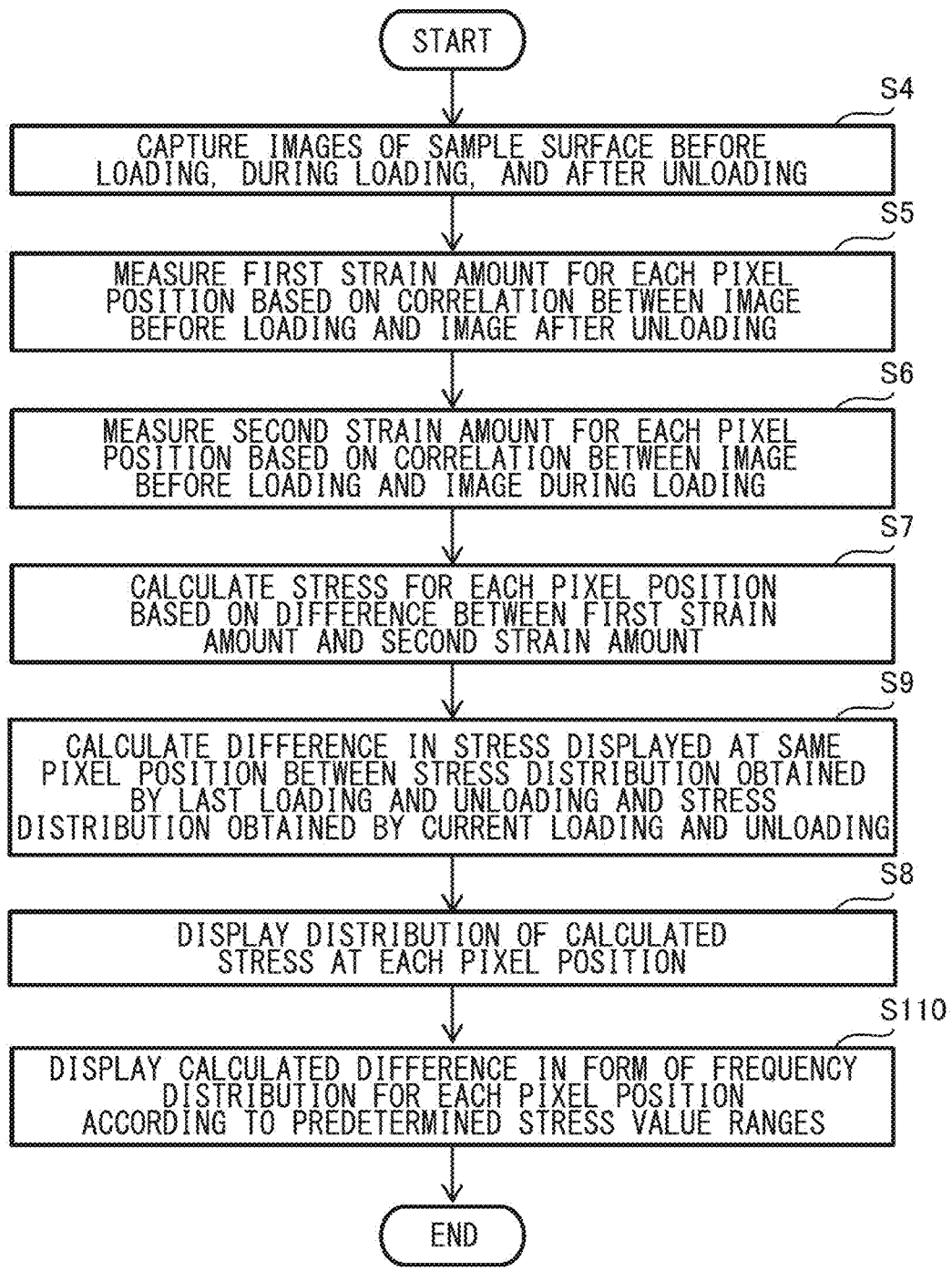
FIG. 6 is a flow chart of a method according to the fourth embodiment.

FIG. 6 is a flow chart of a method according to the fourth embodiment. The fourth embodiment includes step S110 instead of step S10, as compared to the third embodiment.

In step S9, the difference in stress displayed at the same pixel position is calculated between stress distribution obtained by the last (referred to as (n−1)th time) loading and unloading and stress distribution obtained by the current (referred to as nth time) loading and unloading in the present method.

In step S110, the difference calculated in step S9 is displayed in frequency distribution for each pixel position according to predetermined stress value ranges. The predetermined stress value ranges may be arbitrarily determined. Hereinafter, an example will be described where the ranges are determined using twelve ranges, −200 MPa to −100 MPa, −100 MPa to 0 MPa, 0 MPa to 100 MPa, 100 MPa to 200 MPa, 200 MPa to 300 MPa, 300 MPa to 400 MPa, 400 MPa to 500 MPa, 500 MPa to 600 MPa., 600 MPa to 700 MPa, 700 MPa to 800 MPa, 800 MPa to 900 MPa, and 900 MPa to 1000 MPa.

Figure 10:
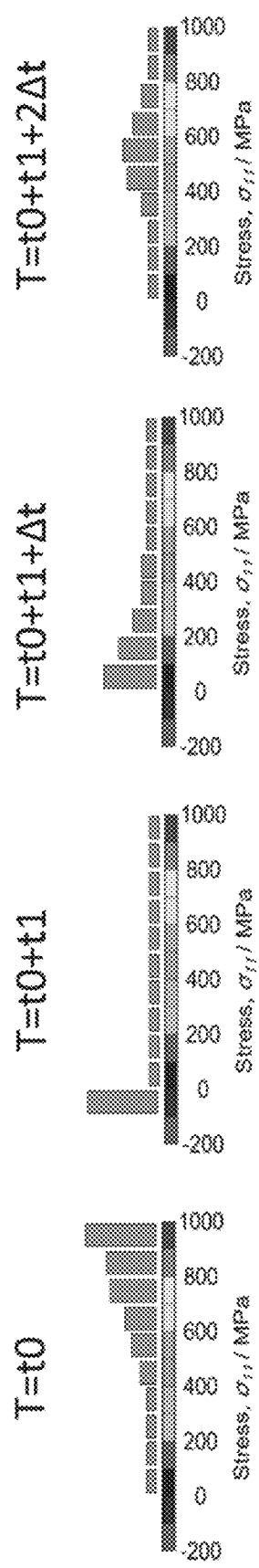
FIG. 10 is a frequency distribution display of stress differences according to the method according to the fourth embodiment.

FIG. 10 is a frequency distribution of a stress difference at a certain pixel position displayed in step S110. In this example, a stress difference at four points in time, (a) T=t0, (b) T=t0+t1, (c) T=t0+t1+Δt, and (d) T=t0+t1+2Δt is displayed in frequency distribution. In this case, T represents time.

At (a) T=t0, it can be found that the larger the stress value, the larger the stress difference. The state of occurrence of residual stress at this point is expressed in (a) in FIG. 10. When loading and unloading are repeated thereafter, the stress difference in each stress value range becomes zero, and the frequency distribution becomes flat. This flat state continues until T=t0+t1 in (b). The frequency distribution display changes at T=t0+t1+Δt at a point in time following (b) (that is, the point in time at which one-time loading and unloading are executed after (b)), and the frequency distribution display is no longer flat. In this case, the time required for one-time loading and unloading is denoted by Δt. This frequency distribution is considered to suggest that a new deformation mechanism has emerged in the material. This indicates that the state of occurrence of residual stress has changed significantly. At the next point in time T=t0+t1+2Δt, the frequency distribution changes to another form ((d)). That is, it is suggested that the deformation mechanism of the material rapidly evolves over time at this stage such that the residual stress changes significantly.

As described, by displaying the obtained stress difference in the form of frequency distribution for each pixel position according to the predetermined stress value ranges, information corresponding to the time derivative of stress can be obtained. Thereby, the state of occurrence of residual stress at each point of the material can be temporally tracked.

As described above, according to the present embodiment, it is possible to estimate and display the time and position when and where local plastic deformation or the like occurs inside a sample when the sample is repeatedly loaded and unloaded.

In one embodiment, the difference between the stresses displayed at the same pixel position may be calculated, and instead of displaying the frequency distribution of a stress difference for each pixel position, the difference between the stresses of the entire material may be calculated, and the difference between the stresses of the entire material may be displayed in frequency distribution for each unloading. According to this embodiment, it is possible to evaluate change in the deformation mechanism of the entire material for each unloading without repeating a lot of loading and unloading for each pixel position and displaying the frequency distribution of the stress difference.

Fifth Embodiment

Figure 7:
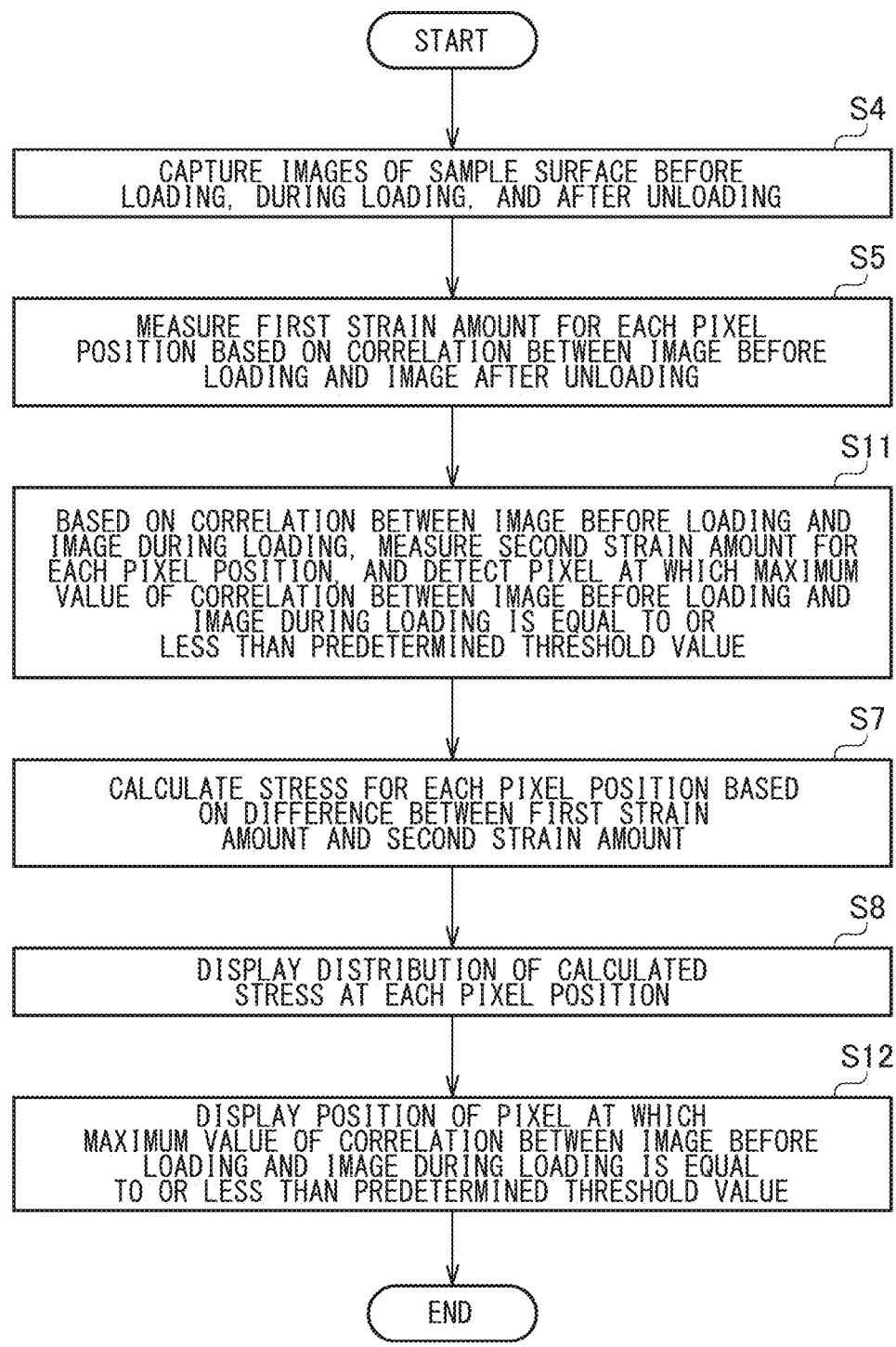
FIG. 7 is a flow chart of a method according to the fifth embodiment.

FIG. 7 is a flow chart of a method according to the fifth embodiment. The fifth embodiment includes step S11 instead of step S6 and further includes step S12, as compared to the second embodiment.

In step S11, based on the correlation between the image before the loading and the image during the loading, a second strain amount for each pixel position is measured, and a pixel at which the maximum value of the correlation between the image before the loading and the image during the loading is equal to or less than a predetermined threshold value is detected in the present method. If no fracture or the like is generated in the sample during the process of repeating the loading and the unloading, it is considered that there is certain correlation between the image before loading and the image after loading. In other words, when a load is applied to the sample, each position of the sample is displaced. However, the displacement of each position is considered to be within a certain range unless fracture or the like occurs. That is, in this case, it is considered that there is correlation between the image before the loading and the image during the loading of the sample. However, if fracture or the like occurs in a part of the sample after the loading, the periphery of the part is largely displaced from that before the loading, and as a result, the correlation between the image before the loading and the image during the loading is lost. In this way, by executing step S11, since a pixel at which the maximum value of the correlation between the image before the loading and the image during the loading is equal to or less than the predetermined threshold value is detected, it can be estimated that local breakage or the like has occurred at a part corresponding to the pixel.

In step S12, the position of a pixel at which the maximum value of the correlation between the image before the loading and the image during the loading detected in step S11 is equal to or less than the predetermined threshold value is displayed in the present method. By executing step 12, the position where it is estimated that local breakage or the like has occurred is visualized.

According to the present embodiment, it is possible to estimate that local breakage or the like has occurred when the sample is repeatedly loaded and unloaded and display the position thereof.

Sixth Embodiment

Figure 8:
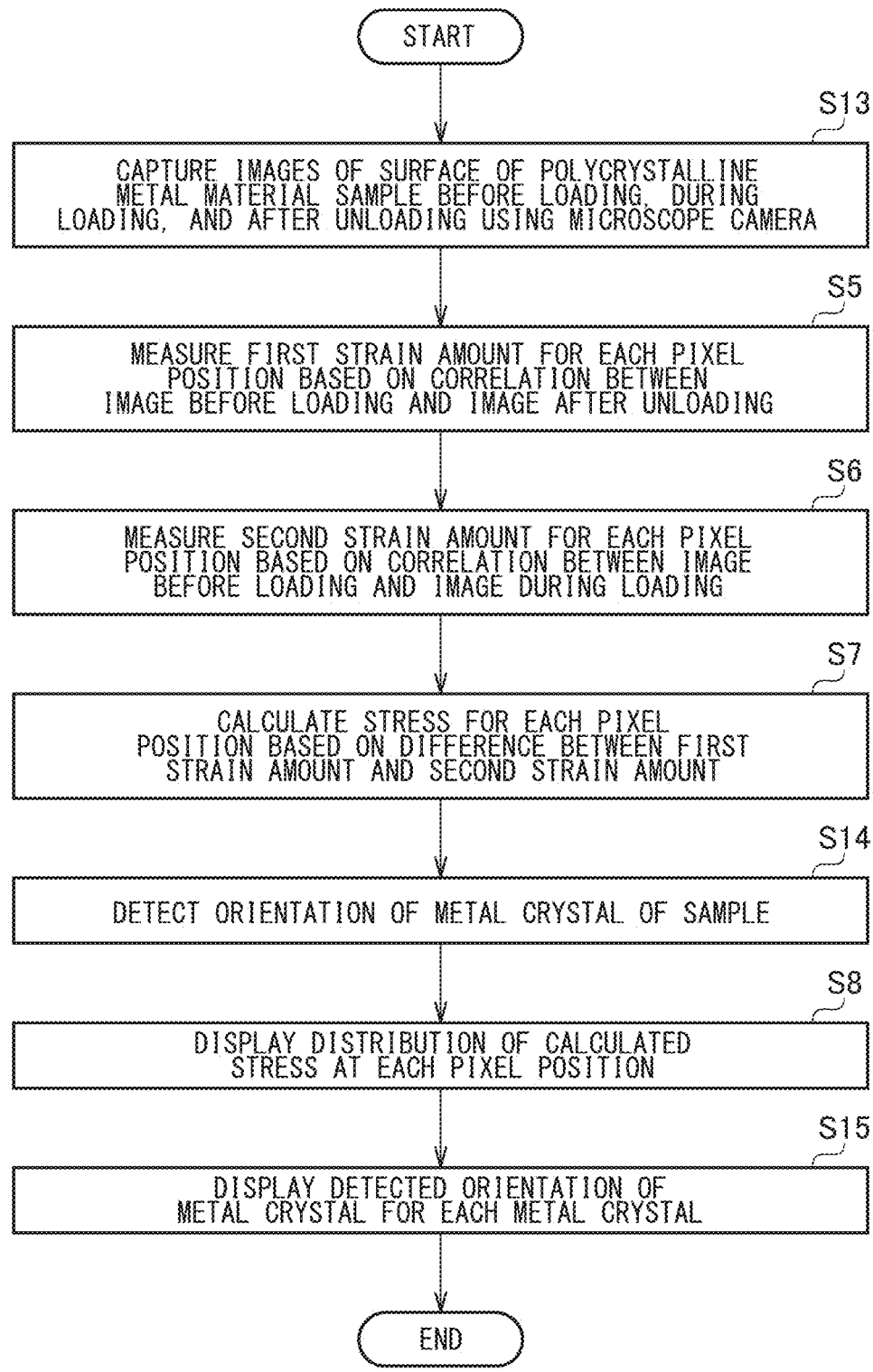
FIG. 8 is a flow chart of a method according to the sixth embodiment.

FIG. 8 is a flow chart of a method according to the sixth embodiment. The sixth embodiment includes step S13 instead of step S4 and further includes steps S14 and S15, as compared to the second embodiment.

In step S13, images of the surface of a polycrystalline metal material sample before the loading, during the loading, and after the unloading are captured using a microscope camera in the present method. The microscope used for the microscope camera is not particularly limited and may be an optical microscope, a scanning electron microscope, a transmission electron microscope, or the like. By capturing the images of the surface of the polycrystalline metal material sample using a microscope camera, information on the crystal structure can be obtained such as crystal grains, grain boundaries, and linear structure on the sample surface.

In step S14, the orientation of the metal crystal of the sample captured in step S13 is detected in the present method.

In step S15, the orientation of the metal crystal detected in step S14 is displayed for each metal crystal. By executing steps S8 and S15, the stress distribution of the sample and the orientation of the metal crystal can be visualized altogether. This allows for, for example, the observation of how stress is concentrated at grain boundaries. Further, it is possible to compare the difference in stress distribution at the boundary between crystals having a small difference in crystal orientation and crystals having a large difference.

According to the present embodiment, it is possible to learn the relationship between grain boundaries and locally generated plastic deformation.

Seventh Embodiment

Figure 9:
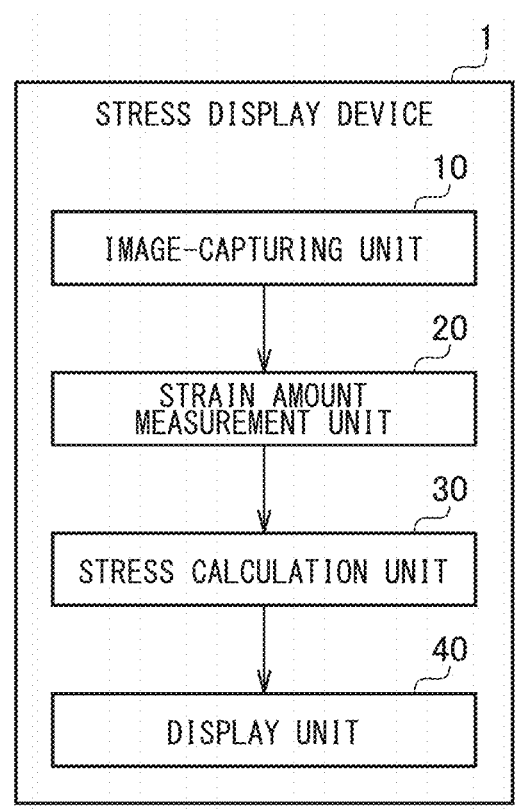
FIG. 9 is a block diagram of a device according to the seventh embodiment.

FIG. 9 is a block diagram of a stress display device 1 according to the seventh embodiment. The stress display device 1 is a device that displays stress distribution on a sample surface while repeatedly loading and unloading the sample and includes an image-capturing unit 10, a strain amount measurement unit 20, a stress calculation unit 30, and a display unit 40.

The image-capturing unit 10 captures the image of a sample surface before loading, during loading, and after unloading and transmits the captured images to the strain amount measurement unit 20. The strain amount measurement unit 20 measures the first strain amount for each pixel position based on the correlation between the image before the loading and the image after the unloading received from the image-capturing unit 10. The strain amount measurement unit 20 also measures the second strain amount for each pixel position based on the correlation between the images before and during the loading received from the image-capturing unit 10. The strain amount measurement unit 20 transmits the measured first and second strain amounts to the stress calculation unit 30. The stress calculation unit 30 calculates the stress for each pixel position based on the difference between the first strain amount and the second strain amount received from the strain amount measurement unit 20. The stress calculation unit 30 transmits the calculated stress for each pixel position to the display unit 40. The display unit 40 displays the distribution of the stress received from the stress calculation unit 30 at each pixel position.

According to the present embodiment, it is possible to realize a device that measures local stress that causes local plastic deformation and the like generated inside a material and visualizes the stress as stress distribution.

Eighth Embodiment

A program according to the eighth embodiment is a program that displays stress distribution on a sample surface while repeatedly loading and unloading the sample. This program includes computer-implemented modules including: a module that captures images of a sample surface before loading, during the loading, and after unloading; a module that measures a first strain amount for each pixel position based on correlation between the image before the loading and the image after the unloading; a module that measures a second strain amount for each pixel position based on correlation between the image before the loading and the image during the loading; a module that calculates stress for each pixel position based on the difference between the first strain amount and the second strain amount; and a module that displays the distribution of the calculated stress at each pixel position.

According to this embodiment, it is possible to realize a process of measuring local stress that causes local plastic deformation and the like generated inside a material and visualizing the stress as stress distribution by a computer.

Described above is an explanation given of the present invention based on the embodiments. These embodiments are intended to be illustrative only, and it will be obvious to those skilled in the art that various modifications to constituting elements and processes could be developed and that such modifications are also within the scope of the present invention.

For example, the strain amount and stress distribution may be acquired for each surface having a different depth by performing tomography. According to the present exemplary variation, the strain amount and stress distribution inside a three-dimensional material can be obtained.

Each of these exemplary variations achieves the same action and effect as those of the embodiments.

Optional combinations of the aforementioned embodiments and exemplary variations will also be within the scope of the present invention. New modes of practicing the invention created by combinations will provide the advantages of the embodiments and exemplary variations combined.

The method according to the present invention can be applied to various materials at low cost, can contribute to material evaluation, manufacturing method selection, material performance improvement, etc., and therefore has extremely high industrial utility.

INDUSTRIAL APPLICABILITY

The present invention can be used in a stress and strain amount distribution display method, device, and program.

REFERENCE SIGNS LIST

S1 a step of capturing images of a sample surface before loading and after unloading, S2 a step of measuring a strain amount for each pixel position based on correlation between the image before the loading and the image after the unloading, S3 a step of displaying the distribution of the measured strain amount at each pixel position, S4 a step of capturing images of a sample surface before loading, during the loading, and after unloading, S5 a step of measuring a first strain amount for each pixel position based on correlation between the image before the loading and the image after the unloading, S6 a step of measuring a second strain amount for each pixel position based on correlation between the image before the loading and the image during the loading, S7 a step of calculating stress for each pixel position based on the difference between the first strain amount and the second strain amount, S8 a step of displaying the distribution of the calculated stress at each pixel position, S9 a step of calculating the difference in stress displayed at the same pixel position between stress distribution obtained by the last loading and unloading and stress distribution obtained by the current loading and unloading, S10 a step of displaying the position of a pixel at which the difference is equal to or greater than a predetermined threshold value, S110 a step of displaying the difference in the form of frequency distribution for each pixel position according to predetermined stress value ranges, S11 a step of measuring a second strain amount for each pixel position based on the correlation between the image before the loading and the image during the loading and detecting a pixel at which the maximum value of the correlation between the image before the loading and the image during the loading is equal to or less than a predetermined threshold value, S12 a step of displaying the position of a pixel at which the maximum value of the correlation between the image before the loading and the image during the loading is equal to or less than the predetermined threshold value, S13 a step of capturing images of the surface of a polycrystalline metal material sample before the loading, during the loading, and after the unloading using a microscope camera, S14 a step of detecting the orientation of the metal crystal of the sample, S15 a step of displaying the detected orientation of the metal crystal, 1 stress display device,
10 image-capturing unit,
20 strain amount measurement unit,
30 stress calculation unit,
40 display unit

The invention claimed is:

1. A method of displaying stress distribution on a sample surface while repeatedly loading and unloading the sample, comprising:
   capturing images of a sample surface before loading, during the loading, and after unloading;
   measuring a first strain amount for each pixel position based on correlation between the image before the loading and the image after the unloading;
   measuring a second strain amount for each pixel position based on correlation between the image before the loading and the image during the loading;
   calculating stress for each pixel position based on the difference between the first strain amount and the second strain amount;
   displaying the distribution of the calculated stress at each pixel position;
   calculating the difference in stress displayed at the same pixel position between stress distribution obtained by the last loading and unloading and stress distribution obtained by the current loading and unloading, and
   displaying a pixel position at which the difference is equal to or greater than a predetermined threshold value.

2. The method according to claim 1, wherein the sample is a polycrystalline metal material, and the capturing images is performed using a microscope camera, the method further comprising:
   detecting the orientation of the metal crystal of the sample; and displaying the detected orientation of the metal crystal.

3. The method according to claim 1, wherein the sample is in an elastic range.

4. A method of displaying stress distribution on a sample surface while repeatedly loading and unloading the sample, comprising:

capturing images of a sample surface before loading, during the loading, and after unloading;

measuring a first strain amount for each pixel position based on correlation between the image before the loading and the image after the unloading;

measuring a second strain amount for each pixel position based on correlation between the image before the loading and the image during the loading;

calculating stress for each pixel position based on the difference between the first strain amount and the second strain amount;

displaying the distribution of the calculated stress at each pixel position;

calculating the difference in stress displayed at the same pixel position between stress distribution obtained by the last loading and unloading and stress distribution obtained by the current loading and unloading; and displaying the difference in stress in the form of frequency distribution for each pixel position according to predetermined stress value ranges.

5. A method of displaying stress distribution on a sample surface while repeatedly loading and unloading the sample, comprising:

capturing images of a sample surface before loading, during the loading, and after unloading;

measuring a first strain amount for each pixel position based on correlation between the image before the loading and the image after the unloading;

measuring a second strain amount for each pixel position based on correlation between the image before the loading and the image during the loading;

calculating stress for each pixel position based on the difference between the first strain amount and the second strain amount;

displaying the distribution of the calculated stress at each pixel position;

calculating the difference in stress of the entire material between stress distribution obtained by the last loading and unloading and stress distribution obtained by the current loading and unloading, and displaying the difference in stress of the entire material in the form of frequency distribution for each unloading.

6. A method of displaying stress distribution on a sample surface while repeatedly loading and unloading the sample, comprising:

capturing images of a sample surface before loading, during the loading, and after unloading;

measuring a first strain amount for each pixel position based on correlation between the image before the loading and the image after the unloading;

measuring a second strain amount for each pixel position based on correlation between the image before the loading and the image during the loading;

calculating stress for each pixel position based on the difference between the first strain amount and the second strain amount;

displaying the distribution of the calculated stress at each pixel position;

detecting a pixel at which the maximum value of the correlation between the image before the loading and the image during the loading is equal to or less than the predetermined threshold value and displaying the position of the detected pixel in the measuring a second strain amount.

7. A device that displays stress distribution on a sample surface while repeatedly loading and unloading the sample, comprising:

an image-capturing unit that captures images of a sample surface before loading, during the loading, and after unloading;

a strain amount measurement unit that measures a first strain amount for each pixel position based on correlation between the image before the loading and the image after the unloading and measures a second strain amount for each pixel position based on correlation between the image before the loading and the image during the loading;

a stress calculation unit that calculates stress for each pixel position based on the difference between the first strain amount and the second strain amount and the difference in stress displayed at the same pixel position between stress distribution obtained by the last loading and unloading and stress distribution obtained by the current loading and unloading; and a display unit that displays the distribution of the calculated stress at each pixel position and a pixel position at which the difference is equal to or greater than a predetermined threshold value.

8. A non-transitory computer readable medium that stores a program that displays stress distribution on a sample surface while repeatedly loading and unloading the sample, comprising computer-implemented modules including:

a module that captures images of a sample surface before loading, during the loading, and after unloading;

a module that measures a first strain amount for each pixel position based on correlation between the image before the loading and the image after the unloading;

a module that measures a second strain amount for each pixel position based on correlation between the image before the loading and the image during the loading;

a module that calculates stress for each pixel position based on the difference between the first strain amount and the second strain amount and the difference in stress displayed at the same pixel position between stress distribution obtained by the last loading and unloading and stress distribution obtained by the current loading and unloading; and a module that displays the distribution of the calculated stress at each pixel position and a pixel position at which the difference is equal to or greater than a predetermined threshold value.

* * * * *